United States Patent [19]

Keating

[11] Patent Number: 5,069,405
[45] Date of Patent: Dec. 3, 1991

[54] MOBILE LEAF BAG LOADING FIXTURE

[75] Inventor: Raymond E. Keating, Overland Park, Kans.

[73] Assignee: Cornerstone Products, Inc., Overland Park, Kans.

[21] Appl. No.: 511,212

[22] Filed: Apr. 19, 1990

[51] Int. Cl.⁵ ............................................. B65B 67/00
[52] U.S. Cl. ........................................ 248/98; 248/99
[58] Field of Search ................. 248/95, 97, 98, 99, 248/100, 101; 220/404

[56] References Cited

U.S. PATENT DOCUMENTS

| | | | |
|---|---|---|---|
| 1,293,277 | 2/1919 | White | 248/98 |
| 1,783,749 | 12/1930 | Roehl | 248/97 |
| 3,893,699 | 7/1975 | Morris | 248/98 X |
| 3,992,034 | 11/1976 | Smith, Sr. et al. | 248/98 X |
| 4,160,557 | 7/1979 | Taylor | 248/98 X |
| 4,202,521 | 5/1980 | Haeding | 248/98 |
| 4,448,434 | 5/1984 | Anderson | 248/98 X |
| 4,452,468 | 6/1984 | Eads et al. | 248/98 X |
| 4,856,740 | 8/1989 | MacLeod et al. | 248/97 |
| 4,917,393 | 4/1990 | Rogers | 248/98 X |

Primary Examiner—David L. Talbott
Attorney, Agent, or Firm—Hovey, Williams, Timmons & Collins

[57] ABSTRACT

A mobile leaf bag loading fixture (10) is provided which includes an elongated back (12), forwardly extending bottom (14), and bag-supporting hoop (18). The fixture (10) is equipped with strategically located wheels (76, 78) permitting the fixture (10) to be placed directly upon a support surface (96) with the wheels being rendered inoperative, so as to facilitate bag loading. When loading operations are completed, the fixture (10) may be raised and wheeled away. Preferably, the hoop (18) consists of interfitted, adjustable sections (82, 84) permitting alteration of the effective size of the hoop (18). In addition the hoop (18) is advantageously oriented at an acute angle relative to back (12), to further ease loading operations.

7 Claims, 2 Drawing Sheets

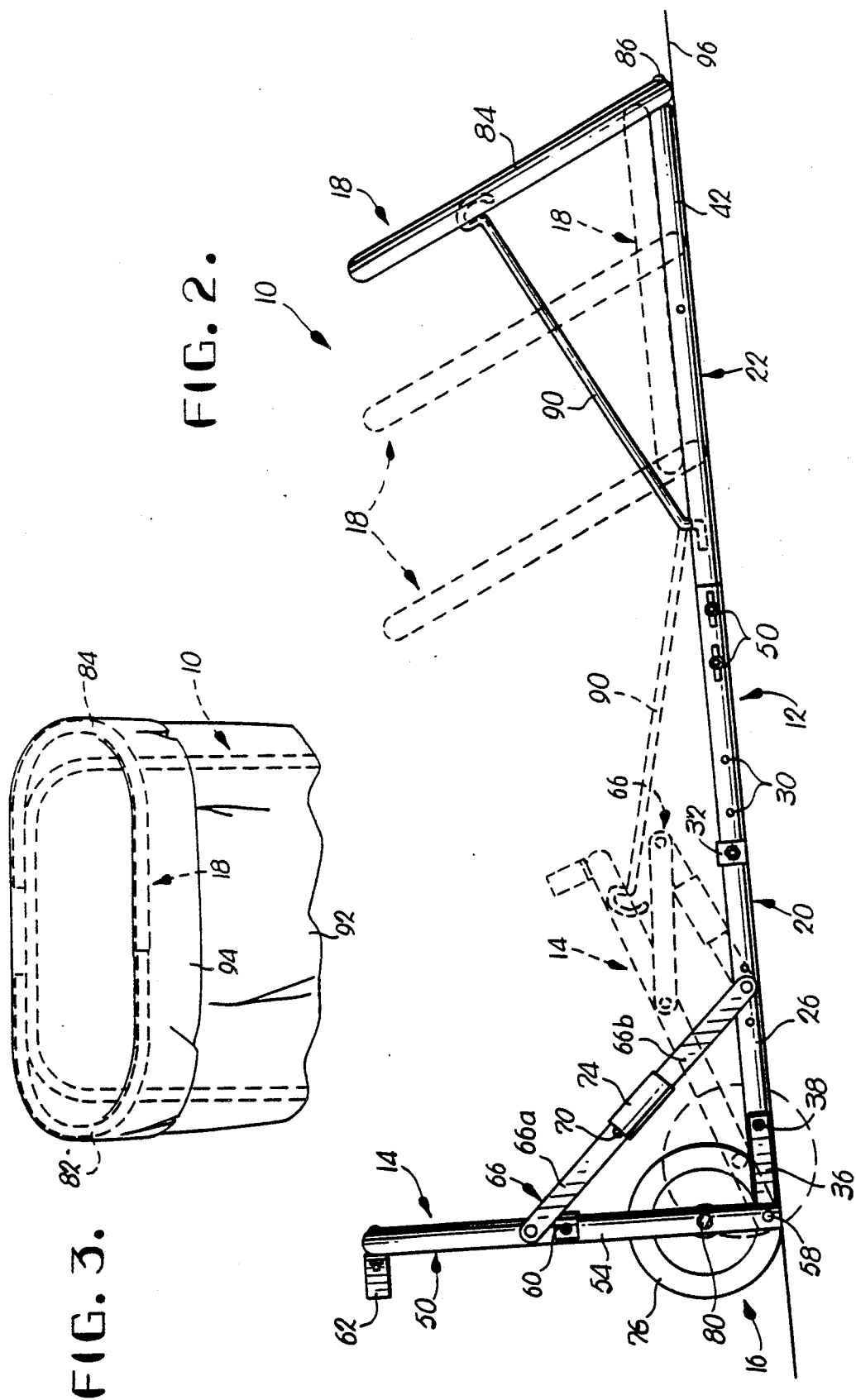

MOBILE LEAF BAG LOADING FIXTURE

BACKGROUND OF THE INVENTION

1. Field of the Invention

The present invention is broadly concerned with an improved mobile fixture specifically designed to facilitate the loading of leaves or other yard refuse into large holding bags. More particularly, it is concerned with such a fixture including strategically located wheels permitting the fixture to be readily moved in an upright or diagonal orientation, and alternately placed in substantially full ground contact with the wheels being rendered inoperative, so as to facilitate filling of the supported bag. In addition, the fixture preferably includes a sectionalized, bag-supporting hoop which can be selectively adjusted so as to vary the hoop size; in this fashion, the hoop can be adjusted so as to frictionally engage and secure a bag in place.

2. Description of the Prior Art

Any homeowner confronted with the task of raking and collecting large amounts of leaves, grass clippings or other garden and yard wastes is familiar with the problem of efficiently loading such materials into large plastic bags. This is particularly the case where the homeowner must work alone, without the aid of someone to hold the bag for filling purposes. Various expedients have been proposed in the past for alleviating these difficulties. For example, U.S. Pat. No. 4,760,982 describes a generally U-shaped paper board insert adapted to be placed within a plastic bag to hold the bag in an opened condition. This approach is deficient in that once filled, the bag insert must be removed, inevitably leading to some spillage of the bag contents. Moreover, this type of bag insert provides no assistance in transporting a filled bag.

U.S. Pat. No. 4,452,468 represents another attempted solution. This patent describes a wheeled cart designed to hold a bag in an opened, upright position for filling purposes. However, this requires that the refuse be manually lifted from the ground and dropped into the open bag; again, spillage and loading inefficiencies are the inevitable result. The cart described in the '468 patent is not designed for placement on the ground in a horizontal position for filling purposes, inasmuch as the wheels thereof remain in operative ground contact when the cart is horizontal. As a consequence, an attempt to load the cart in this position leads to inadvertent movement of the cart across the ground. In addition, this prior art cart is equipped with an upper, rearwardly extending handle. Thus, if the cart is laid horizontal, the handle in effect elevates the bag opening off the ground, again requiring that the refuse be lifted into the bag opening.

SUMMARY OF THE INVENTION

The present invention overcomes the problems outlined above and provides a greatly improved mobile bag loading fixture designed for use with large plastic leaf bags. Broadly speaking, the fixture includes an elongated back presenting a pair of opposed ends, together with a relatively short, forwardly extending bottom coupled with the back adjacent one end of the latter. Means preferably in the form of a hoop is secured to the back adjacent the other end thereof, and serves to support and retain a leaf bag in an opened, loading orientation. The fixture of the invention is also provided with a pair of wheels each presenting a radius, with such wheels being secured to the bottom and strategically located for permitting the fixture to lie flat on the ground or other support surface with the wheels being rendered inoperative and the back being in contact with the support surface throughout its length. In particular, the wheels are rotatable about respective axes, such being located in spaced relationship and forwardly of the back a distance at least about as great as the wheel radii.

The bag-supporting hoop is preferably constructed for permitting selective alteration of the effective hoop size so as to tightly engage and hold bags of various sizes. To this end, the preferred hoop assembly comprises a pair of interfitted, arcuate, hoop-defining members each adjustably secured to the fixture back so as to permit selective expansion and contraction of the hoop.

BRIEF DESCRIPTION OF THE DRAWINGS

FIG. 2 is a side view of the fixture depicted in FIG. 1, with the rear side wheel removed for clarity and showing in phantom the retracted position of the bottom section, and alternate height adjustments of the back; and FIG. 3 is a fragmentary view illustrating a leaf-holding bag placed within the fixture, with certain of the fixture components being illustrated in phantom.

DESCRIPTION OF THE PREFERRED EMBODIMENT

Figure 1:
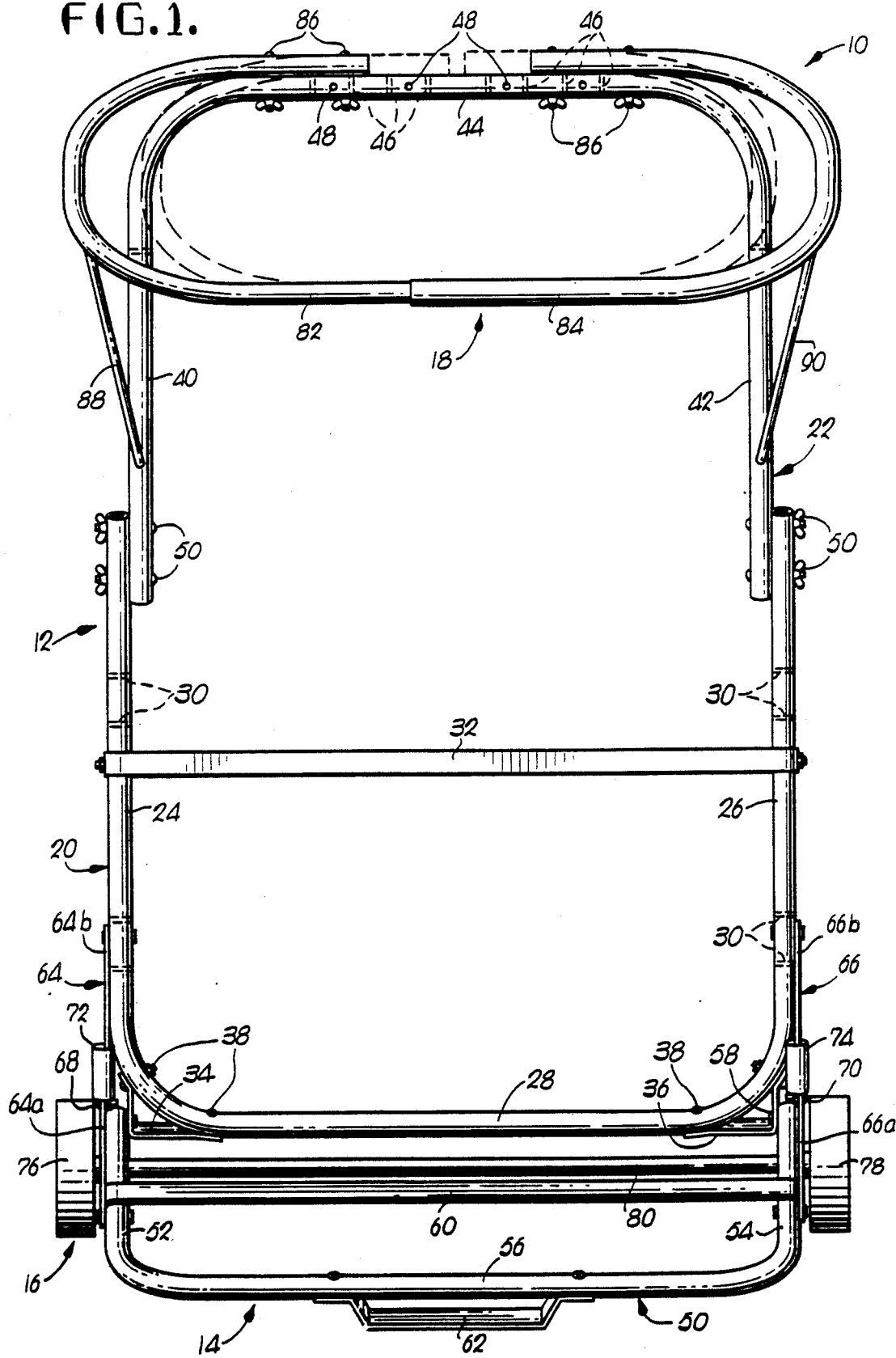
FIG. 1 is a plan view of the preferred mobile leaf bag loading fixture in accordance with the invention, with respective positions of the bag-supporting hoop being shown in phantom and in full lines.

Turning now to the drawings, in particular FIGS. 1 and 2, a mobile fixture 10 in accordance with the invention is illustrated. Broadly speaking, the fixture 10 includes an elongated, adjustable back 12, a forwardly projecting base or bottom 14, wheel assembly 16, and a sectionalized hoop 18 secured to back 12 at the end thereof opposite bottom 14.

In more detail, the back 12 includes a pair of interconnected, U-shaped sections 20, 22. As illustrated in FIG. 1, the section 20 presents a pair of legs 24, 26, together with an interconnecting bight 28. Each leg 24, 26 is provided with at least three sets 30 of connecting apertures therethrough. Specifically, each set 30 is vertically spaced along the length of the corresponding leg 24, 26, with each set comprising a pair of through apertures. In addition, a bag support strap or brace 32 extends between and is interconnected to the legs 24, 26. The bight ends of the legs 24, 26 (i.e., at the rounded corners of the section 20) are each equipped with a generally triangular shaped mounting element 34, 36, secured thereto by means of fasteners 38.

Section 22 likewise presents a pair of legs 40, 42, together with an interconnecting bight section 44. As shown in FIGS. 1 and 2, the extreme ends of the legs 40, 42 are provided with a pair of connecting apertures therethrough, whereas bight section 44 has at least three sets 46 of hoop-adjusting apertures therethrough, with the axes of these apertures being substantially parallel with the legs 40, 42. In addition, the bight section 44 has at least three additional aperture sets 48, each consisting of two through apertures; these apertures are oriented with their axes transverse to the longitudinal axes of the legs 40, 42.

As best seen in FIG. 1, section 22 is of a slightly smaller width than the corresponding section 20, so that the ends of the legs 40, 42 fit within and lie in close adjacency to the legs 24, 26. In use, manual release fasteners 50 are employed to releasably interconnect the sections 20, 22, i.e., such fasteners pass through the apertures provided through the legs 40, 42, and a corresponding aperture set 30 of the legs 24, 26.

Bottom 14 is in the form of a tubular, generally U-shaped member 50 including a pair of legs 52, 54 and an interconnecting bight 56. The extreme ends of the legs 52, 54 are interconnected by means of fasteners 58 to the adjacent mounting elements 34, 36, such that the bottom extends forwardly from back 12 in a generally transverse orientation relative thereto. A bag support brace 60 spans the legs 52, 54 and is connected to each of the same. A ground-engaging bumper or foot 62 is secured to bight 56 at the central region thereof to stabilize fixture 10 in its upright orientation as will be described. A pair of pivotal buckling braces 64, 66 extend between and are pivotally interconnected to the section 20 and member 50, so as to provide additional support for bottom 14. Each brace 64, 66 includes a pair of elongated, pivotally interconnected subsections 64a, 64b and 66a, 66b. The subsections 64b and 66b are provided with a transverse stop 68, 70, and a corresponding metallic sleeve 72, 74 is slidable along the length of the subsections 64b, 66b for purposes to be described.

Wheel assembly 16 comprises a pair of ground-engaging wheels 76, 78 mounted for rotation upon elongated axle 80 which spans and passes through the bottom legs 52, 54. It will be noted in this respect that the axle 80 is located forward of back 12 a distance about as great as the radius of the wheels 76, 78.

Hoop 18 includes a pair of arcuate, somewhat J-shaped hoop members 82, 84 which cooperatively defined a complete bag-supporting hoop. As illustrated in FIG. 1, one end of the member 82 is telescoped into the corresponding end of section 84. The opposed ends of the section 82, 84 are connected to bight 44 of back section 22. Specifically, each of these hoop members 82, 84 is provided with connection apertures therethrough which are located for mating alignment with members of the aperture sets 46, and alternately with the members of aperture sets 48. Manual release fasteners 86 are used to releasably interconnect the apertured ends of the hoop members 82, 84 to bight 44. Reinforcing struts 88, 90 extend between and are interconnected to the hoop members 82, 84 and the corresponding legs 40, 42 of back section 22 and travel with hoop members 82, 84 when various hoop size adjusting apertures are selected. Referring particularly to FIG. 2, it will be observed that the hoop 18 is connected to the back 12 in such fashion that the hoop lies in a plane which is oriented at an acute angle relative to back 12.

FIG. 3 illustrates a plastic leaf bag 92 operatively positioned on fixture 10. In particular, the open end margin 94 of the bag is spread over the hoop 18 in order to hold the bag in an opened, loading position. The lower closed end of the bag (not shown) is situated adjacent bottom 14.

In the use of fixture 10, a bag 92 is first placed thereon as previously described. The fixture may then be wheeled to an appropriate loading location and placed in the position depicted in FIG. 2. That is, the back 12 of fixture 10 is laid directly upon a support surface 96 so that the back contacts this surface throughout its entire length. Furthermore, by virtue of the location of wheels 76, 78, it will be seen that the wheels are rendered inoperative when the fixture 10 is in its loading position. Stated otherwise, the wheels 76, 78, while in engagement with surface 96, nevertheless do not support fixture 10 nor are the wheels permitted to roll in this orientation. The user may readily fill bag 92 by pushing leaves or other refuse directly into the open bag end. The inclined orientation of hoop 18 facilitates bag filling because a loading implement such as a rake or the like may be pushed into the mouth of the bag without interference with the hoop. When bag 92 is completely full, the fixture 10 may be grasped, typically at the region of hoop sections 82, 84, and lifted upwardly. At this point the wheels 76, 78, become operative describing the transport position and the entire fixture, together with the loaded bag 92 may then be wheeled to a bag storage location and bag 92 removed. Also, because the fixture 10 may be readily moved between its loading and transport positions, the user can initially fill the bag, lift the fixture to its upright position, tamp the bag contents, and then relower the fixture to the loading position for further filling.

The fixture 10 can also readily accommodate bags of different sizes. Specifically, this is accomplished by releasing the manual release fasteners 0, shifting the back section 22 upwardly or downwardly as required until the appropriate connection aperture sets of the legs 24, 26 and 40, 42 are in alignment, and reconnecting the legs. The alternate positions of the back 12 are illustrated in phantom in FIG. 2. In addition, the effective size of hoop 18 may be changed to fit varying bag sizes. Such may be done by releasing the manual release fasteners 86, and adjusting the interfitted hoop sections 82, 84 inwardly or outwardly as desired, and reconnecting the hoop sections to bight 44 via appropriate ones of the apertures of the sets 46. Exemplary alternate positions of the hoop 18 are shown in phantom and in bold lines in FIG. 1, providing at least three aperture sets 46, 48 for a total of six alternate independent sizes of hoop 18.

The fixture 10 is also equipped for compact storage. Specifically, and again as depicted in phantom in FIG. 2, the bottom assembly 14 may be pivoted towards back 12 when desired. This involves shifting the sleeves 72, 74 towards back 12, and folding the buckling braces 64, 66 as depicted until the bottom 14 and wheel assembly 16 assume the retracted position shown in FIG. 2. In addition, hoop 18 may be conveniently placed in a storage position adjacent back 12. This involves removal of the manual release fasteners 86, disengagement of the struts 88, 90, and placement of hoop sections 82, 84 with the apertures thereto in alignment with the apertures of sets 48. The manual release fasteners 86 are then used to secure the hoop 18 into the storage position illustrated in phantom in FIG. 2.

What is claimed is:

1. A mobile leaf bag loading fixture for use with a flexible bag and adapted for horizontal placement on a support surface to permit direct loading of the bag through its mouth, said fixture comprising:
an elongated back presenting a pair of opposed ends;
a bottom;
means operably coupling said bottom to said back adjacent one end of the back with the bottom extending forwardly from the back;
an elliptical hoop assembly at the other end of said back for releasably securing a leaf bag therefrom, by stretching the open mouth of the bag over the hoop, the bag extending along said back; means securing said elliptical hoop assembly to said back with the hoop being oriented at an acute angle relative to the longitudinal axis of the back;

a pair of wheels at said one end of the fixture each presenting a radius;

means mounting said wheels in spaced, opposed relationship on said bottom for rotation about respective axes, for permitting said fixture to be moved from a transport position wherein said back is upright, and a loading position wherein said back and said bag are generally horizontal, the bag and the back being in contact with said support surface throughout the length thereof respectively with said wheels being rendered inoperative; and the hoop and the mouth of the bag totally defining the other, unobstructed end of the fixture; and when the fixture is horizontal, access to the mouth being unimpeded whereby leaves may be swept in a horizontal path from the support surface directly into the bag through the mouth, to thereby eliminate any lifting of the leaves.

2. The fixture of claim 1, said back comprising a frame including a pair of interconnected, generally U-shaped sections.

3. The fixture of claim 2, including means for releasably and alternately interconnecting said sections at any one of a number of relative positions for varying the effective length of said back.

4. The fixture of claim 1, said bottom comprising a generally U-shaped frame member presenting a pair of legs and an interconnecting bight, said ends being operably coupled with said back 5. The fixture of claim 1, said wheels being mounted adjacent the ends of a single, elongated axle generally parallel with and located forwardly of said back.

6. The fixture of claim 1, said hoop comprising a pair of interfitted, arcuate, hoop-defining members each releasably secured to said back, there being structure permitting relative adjustment of said hoop-defining members for varying the effective size of said hoop.

7. The fixture of claim 1, said means coupling said back and bottom including structure for permitting selective pivoting movement of the bottom to a retracted, storage position adjacent said back.

* * * * *